Aug. 1, 1939.  J. McA. HARRIS, JR., ET AL  2,167,718
APPARATUS FOR SUBJECTING LIQUIDS TO SILENT ELECTRIC DISCHARGE
Filed Dec. 26, 1935  2 Sheets—Sheet 1

John McA. Harris, Jr.
Clarence A. Matherne Inventors
By P. L. Young Attorney

John McA. Harris, Jr.
Clarence A. Matherne Inventors
By P. L. Young Attorney

Patented Aug. 1, 1939

2,167,718

UNITED STATES PATENT OFFICE 2,167,718

APPARATUS FOR SUBJECTING LIQUIDS TO SILENT ELECTRIC DISCHARGE

John McArthur Harris, Jr., and Clarence A. Matherne, Baton Rouge, La., assignors to Standard Oil Development Company, a corporation of Delaware Application December 26, 1935, Serial No. 56,248

12 Claims. (Cl. 204—31)

This invention relates to an improved apparatus for subjecting liquids to silent electric discharge.

The treatment of liquids by silent electric discharge has many applications, including the thickening of mineral, animal and vegetable fluids in vapor or liquid phase including oils and waxes in order to prepare improved lubricants of higher viscosity and other polymerization and condensation products suitable for addition to lubricating oils to increase their viscosity and viscosity index, to reduce the pour point of waxy oils and to improve the oils in many other ways. The silent electric discharge is also suitable for preparing polymerization and condensation products of substantially all fluid carbonaceous materials including both natural and synthetic organic esters, acids, alcohols and derivatives and substitution products thereof and mixtures of such classes of compounds.

Due to the relatively small distances between electrodes required in order to permit operation at reasonable voltages and power consumptions, great difficulties have been experienced providing proper control of reaction conditions. It is customary to pass the liquids being treated in a thin film and under suitable vacuum between electrodes connected to suitable sources of power, preferably alternating at high frequency, so that the oil is subjected to silent or luminous electrical discharge as it flows between the electrodes. Local variations or stoppage in flow of the oil causes local overtreatments resulting in the formation of highly viscous or plastic solid products which may seriously interfere with the operation of the voltolizer and degrade the products.

It is an object of this invention to provide an apparatus permitting positive and constant control of both the circulation and the thickness of the oil films between the electrodes. With suitable modifications of this invention the oil may be recirculated between the electrodes in a simple and efficient manner which permits ready observation of the rate of recirculation and does not involve the addition of moving parts and accordingly does not increase the chance of loss of vacuum.

The drawings present an illustration in sectional elevation of a suitable type of apparatus according to the present invention.

Figure 1:
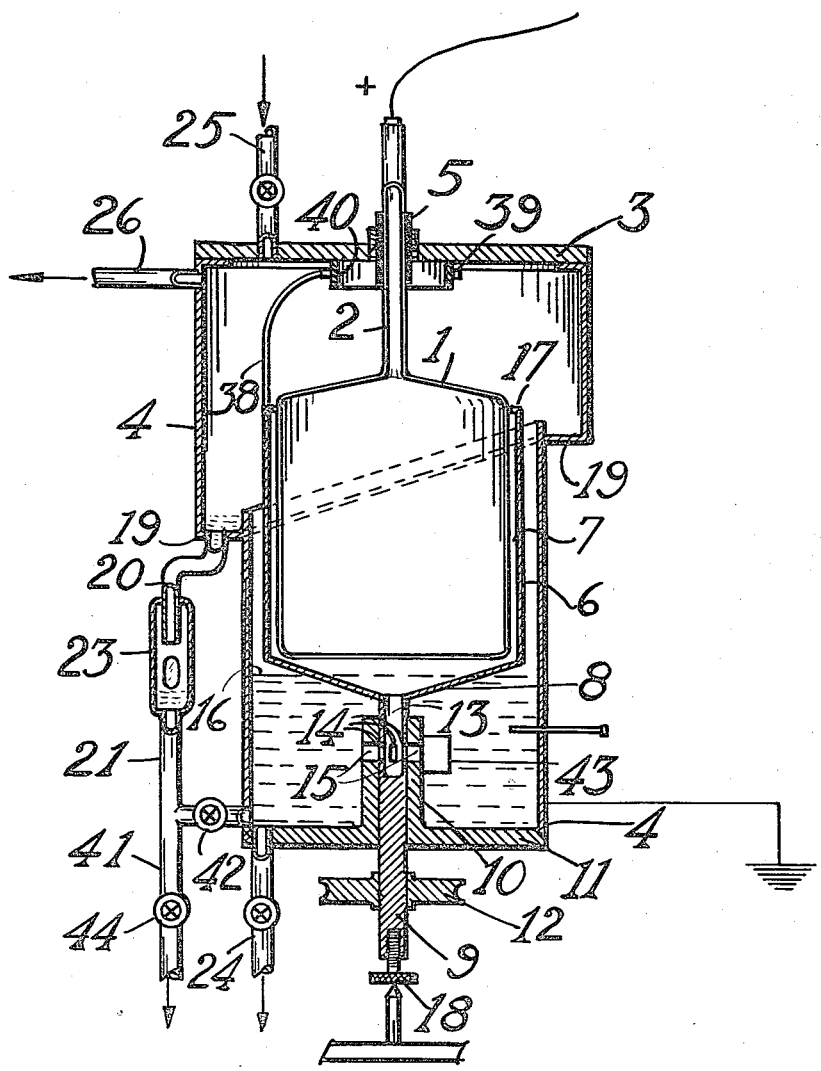
Fig. 1 is a sectional elevation of a device according to the present invention having one stationary and one rotating electrode.

Referring to Fig. 1, a stationary electrode 1 is suspended by means of a rod or neck 2 from the top 3 of a gas-and-oil-tight shell 4. This electrode is preferably electrically insulated from the shell by any suitable means such as the insulation bushing 5 and is connected to any suitable source of electricity such as to one pole of a high voltage high frequency alternating current generator (not shown), the other pole of such generator being grounded. The electrode 1 may be of any suitable construction. It has preferably a di-electric outer surface and a conducting inner surface. For example, it may be constructed of glass which is silvered on its inner surface. The inner conducting surface is obviously the one connected to the source of electricity.

The outer electrode 6 is also cylindrical and is preferably concentrically disposed about the inner electrode, leaving an annular space 7 between the two electrodes. The lower end of the electrode 6 projecting below electrode 1 is tapered in the form of a conical section 8 which in turn is mounted upon shaft 9 which projects through a journal 10. This journal is carried by the bottom 11 of shell 4, and with the shaft 9 provides a vacuum tight bearing. The shaft 9 is rotated by any suitable means, such as by driven pulley 12. If desired for greater rigidity, the rotating electrode 6 may be connected to beams 38 which are connected to a ring 39 which rotates about journal 40.

The liquid to be subjected to the silent electric discharge is supplied to the inner surface of the lower end of the conical section 8 by any suitable means. For example, shaft 9 may be made hollow for a portion of its length projecting into the journal 10 as indicated at 13 and one or more openings 14 may be provided through the wall of this portion. The journal 10 may be provided with one or more openings 15 through the upper part of its wall. When the openings 14 and 15 are opposed, liquid is then free to flow under its own head from the reservoir 16 into the hollow portion 13 of the shaft 19 and up into the lower portion of the conical section 8. It is then forced by the rotation of the shaft 9 upwardly and outwardly against the inner surface of the rotating electrode 6.

One or more vanes 43 may be mounted on the journal 10 in such manner as to oppose the rotation of liquid in the reservoir 16 and to direct it into the openings 15.

The dam 17 projects inwardly from the inner surface of the electrode 6 at its upper end and serves to regulate the thickness of the film of liquid disposed upon the inner surface of this electrode. The rate of flow of liquid into the rotating electrode and hence the rate of flow of liquid through the annular space 7 may be controlled by varying the elevation of the shaft 9 by means of the screw 18. By this means the size of the overlap between openings 14 and 15 may be decreased to any desired degree.

The excess oil above that required to maintain the desired thickness of film in the annular space 7 is discharged over the top of the dam 17 against the inner surface of the upper portion of the jacket 4 and is returned by gravity flow to the liquid reservoir 16. If desired the rate of discharge may be observed by collecting this oil in a gutter 19 and returning it by suitable lines 20 and 21 through a look box 23.

As the oil becomes sufficiently treated, it may be removed from the system through line 24. Fresh liquid may be supplied through lines 24 or 25 as desired. In continuous operation, it is generally preferable to supply fresh liquid through line 25 and to withdraw treated liquid through line 24.

A suitable vacuum of the order of about 1 to 10 centimeters of mercury is maintained within the shell 4 by connecting any suitable exhauster to line 26. The shell 4 and shaft 9 are grounded.

The apparatus may also be operated for subjecting fluids to a single treatment, on a once-through basis. In such case the axis of the rotating electrodes may be vertical or horizontal, and the feed may be supplied from either end. For example, fluid may be supplied through line 24 and withdrawn through line 41 valve 42 being closed.

In the treatment of gases, the outer electrode may be perforated so that liquid products of condensation are forced through the electrode and removed from the reaction zone by the centrifugal action, thereby preventing overvoltolization.

Figure 2:
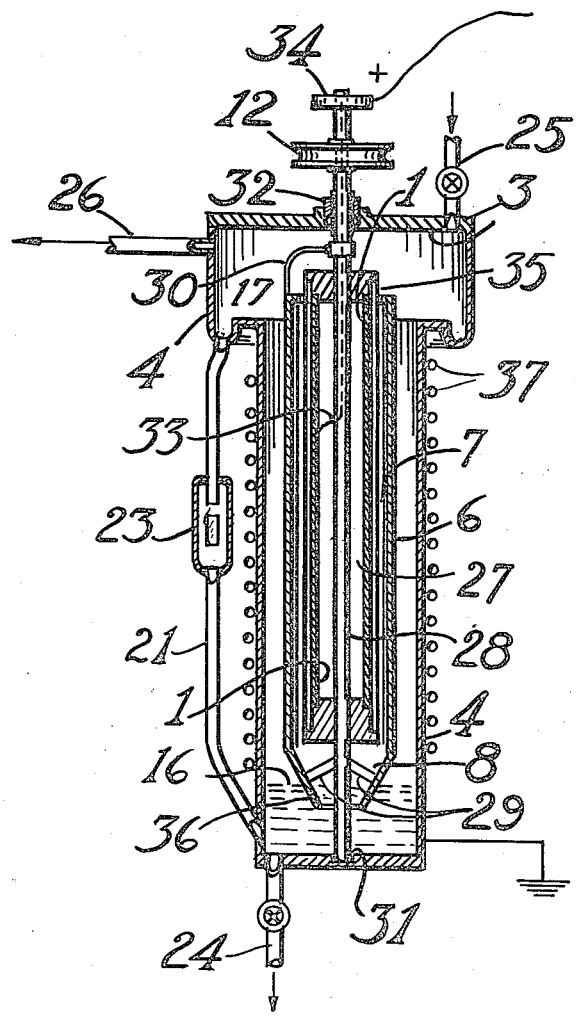
Fig. 2 is a sectional elevation of a device in which both electrodes rotate as a unit.

Fig. 2 indicates a second modification of a suitable apparatus according to this invention in which both electrodes are rotatable. The inner cylindrical electrode 1 is mounted by means of a di-electric 27 on shaft 28. The outer cylindrical electrode 6 is also mounted upon this shaft by supports 29 which are electrical conductors. Additional supports 30 may also be used to make this connection more rigid if desired. The shaft 28 rests at its lower end in a journal 31 and projects through journal 32 in top 3 of the jacket or shell 4 and is rotated by driven pulley 12. The jacket 4, the outer surface of the shaft 28 and hence the outer electrode 6 are grounded. A conductor 33 connects the inner electrode 1 with a suitable source of electricity under high tension by means of slip ring 34. This conductor extends inside shaft 28 which is hollow and lined with suitable di-electric for the required portion of its length, and is carefully insulated from the conductor 33 by any suitable means.

A cylindrical di-electric 35 is preferably mounted on the outer surface of the inner electrode 1. The di-electric may be a glass cylinder, or fibre board, or an enamel or other suitable coating. The di-electric may alternatively be mounted on the inner surface of the outer electrode.

A conical section 8 of the outer electrode 6 projects downwardly into a reservoir 16 of liquid maintained in the lower portion of the shell 4. The rate of flow of oil into the annular space 8 may be regulated simply by adjusting the height of liquid in this reservoir. The flow may also be regulated as shown in Fig. 1 or by any other suitable means. For example, the bottom end of the conical section 8 may be completely closed and one or more small holes 36 may be provided through this section.

The liquid treated may be recycled directly or by any suitable means as through look box 23. Suitable means may also be provided for supplying or withdrawing heat from the reaction zone. For example, a heating or cooling fluid may be passed through coils 37 in contact with the surface of the shell 4.

As it is generally desirable to conduct the reaction at temperatures somewhat above room temperature and as the reaction itself is exothermic, it is ordinarily preferable to preheat with the materials to be treated and the apparatus, before starting the reaction, particularly if the initial materials are normally solid, and then to apply cooling to prevent overheating during the remainder of the run. Heat may be conveniently withdrawn from the system by coil 37 or by passing the recycled oil in line 21 through a heat exchanger (not shown) or by disposing cooling coils within the reservoir 16.

It is obvious that many variations may be made in the above described apparatus without departing from the essential features thereof. The invention is accordingly not to be limited by the various details of the devices described above and shown in the accompanying drawings, as these are presented solely for purpose of illustration, but is to be limited only by the following claims in which it is desired to claim all novelty insofar as the prior art permits.

We claim:

1. In an apparatus for subjecting liquids to silent electric discharge, a cylindrical inner electrode, a cylindrical outer electrode concentric therewith spaced from and encircling said inner electrode forming a uniform annular space between adjacent sides of said cylindrical electrodes, means for supplying a liquid to one end of the annular space between said electrodes to form on the outer electrode a film of thickness less than the width of said annular space, means for rotating said outer electrode at a speed sufficient to make said liquid film continuous over the inner surface of said outer electrode, means for producing a silent electric discharge between said electrodes, and an annular ring projecting inwardly from the inner surface of said outer electrode at the other end of said annular space to limit the minimum thickness of said liquid film.

2. Apparatus according to claim 1, comprising means for repassing liquid discharged from said annular space therethrough.

3. Apparatus according to claim 1, comprising means for repassing liquid discharged from said annular space therethrough and means for observing the rate at which said liquid is discharged.

4. Apparatus according to claim 1, in which the axis of said cylindrical electrodes is substantially vertical.

5. In an apparatus for subjecting liquids to silent electric discharge, a cylindrical inner electrode having a vertical axis, an outer cylindrical electrode concentric therewith, spaced from and encircling said inner electrode, means for supplying a liquid to the lower end of said outer electrode, means carried by said outer electrode for forcing said liquid into the annular space between said electrodes, means for rotating said outer electrode at a speed sufficient to cause said liquid to flow upwardly through said annular space in a thin layer disposed against the inner surface of said outer electrode and to pass from the upper end of said annular space, and means for maintaining a silent electric discharge in said annular space.

6. Apparatus according to claim 5 in which said means carried by said outer electrode for forcing said liquid into said annular space comprises a conical segment concentric with said electrode and tapering downwardly.

7. Apparatus according to claim 5 comprising a conical segment carried by said outer electrode and tapering downwardly and means for supplying said liquid to the inner surface of said conical segment at its lower end.

8. Apparatus according to claim 5 comprising means for controlling the rate at which said liquid is supplied to said lower end of said outer electrode.

9. In an apparatus for subjecting liquids to silent electric discharge, two vertical cylindrical concentric electrodes having an annular space therebetween, the outer electrode tapering inwardly at the lower end, means for supplying a liquid to the inner surface of said tapering section, means for rotating said outer electrode at a speed sufficient to cause said liquid to flow upwardly through said annular space in a thin layer disposed against the inner surface of said outer electrode and to discharge from the upper end of said annular space, means for collecting said discharged liquid, means for observing the rate at which said liquid is discharged, means for returning said discharged liquid to said conical segment, and means for maintaining a silent electric discharge in said annular space.

10. Apparatus according to claim 9 comprising an annular ring projecting inwardly from the inner surface of said outer electrode at its upper end for determining the thickness of said liquid film in said annular space.

11. Apparatus according to claim 9 comprising an outer pressure-tight shell surrounding said electrodes, having means for maintaining a body of said liquid about the lower end of said outer electrode, means for returning the liquid discharged from the upper end of said annular space to said body of liquid without substantial variation in pressure by gravity flow, means for withdrawing fluid from said body, and means for maintaining a pressure within the jacket suitably reduced to permit said silent electric discharge.

12. Apparatus according to claim 9 in which a di-electric is in the annular space between said electrodes, and is mounted on the surface of one of said electrodes.

JOHN McARTHUR HARRIS, Jr.
CLARENCE A. MATHERNE.